US012600279B2

(12) United States Patent
Kishi

(10) Patent No.: US 12,600,279 B2
(45) Date of Patent: Apr. 14, 2026

(54) VEHICULAR DOOR TRIM

(71) Applicant: TOYOTA BOSHOKU KABUSHIKI KAISHA, Aichi-ken (JP)

(72) Inventor: Kenta Kishi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 401 days.

(21) Appl. No.: 18/209,251

(22) Filed: Jun. 13, 2023

(65) Prior Publication Data

US 2023/0415626 A1 Dec. 28, 2023

(30) Foreign Application Priority Data

Jun. 22, 2022 (JP) ................................ 2022-100062

(51) Int. Cl.
B60N 2/75 (2018.01)
B60R 13/02 (2006.01)

(52) U.S. Cl.
CPC ............ B60N 2/78 (2018.02); B60R 13/0243 (2013.01); *B60R 2013/0287* (2013.01)

(58) Field of Classification Search
CPC .................. B60N 2/78; B60R 13/0243; B60R 2013/0287
See application file for complete search history.

(56) References Cited

U.S. PATENT DOCUMENTS

2024/0025091 A1* 1/2024 Schnitzler ............ B60H 1/2227

FOREIGN PATENT DOCUMENTS

| JP | 11-291848 | 10/1999 |
| JP | 2014-205388 | 10/2014 |
| JP | 2016124381 A * | 7/2016 |

OTHER PUBLICATIONS

Machine translation of Hinokio et al.; JP 2014-205388; published Oct. 30, 2014. (Year: 2014).*
Japan Office Action issued in Japan Patent Application No. 2022-100062, dated Sep. 2, 2025, together with English translation thereof.

* cited by examiner

*Primary Examiner* — Daniel J Colilla
(74) *Attorney, Agent, or Firm* — Greenblum & Bernstein, P.L.C.

(57) ABSTRACT

A vehicular door trim includes an armrest including a first mount member, a pull handle, an opening section, and a switch base. The pull handle includes a body portion and an extending portion that extends from the body portion and includes a second mount member that is fitted to the first mount member. The opening section is defined by the armrest and the extending portion with the second mount member being fitted to the first mount member. The switch base includes a third mount member that is fitted to the second mount member and disposed in the opening section to cover the opening section with the third mount member being fitted to the second mount member.

15 Claims, 10 Drawing Sheets

VEHICULAR DOOR TRIM

CROSS REFERENCE TO RELATED APPLICATION

This application claims priority from Japanese Patent Application No. 2022-100062 filed on Jun. 22, 2022. The entire contents of the priority application are incorporated herein by reference.

TECHNICAL FIELD

The present disclosure relates to a vehicular door trim.

BACKGROUND

One example of a vehicular door trim includes an armrest that projects toward a vehicular interior side. The armrest includes an armrest body, a pull handle piece, and a door center piece. The armrest body is included integrally with a door trim body and projects toward the vehicular interior side. The pull handle piece and the door center piece are separate members from the door trim body. The pull handle piece includes a plate member and a pair of fitting pieces that project downward from a lower surface of the plate member. With lower surfaces of the fitting pieces being contacted with a projection portion of the armrest body, the pull handle piece is fixed to the door trim with clips. The door center piece includes an upper wall, a side wall, and ribs that project from the upper wall and the side wall. With the ribs being fitted to fitting grooves on the fitting pieces of the pull handle piece. The door center piece includes clip seats on a lower edge portion of the side wall and the clips are mounted in the clip seats. With the clips being inserted in clip holes of the door trim, the door center piece is fixed to the door trim.

In such a vehicular door trim, the process of mounting the components has been demanded to be made simple and easy. Mounting strength of the components has been demanded to be increased and mounting spaces have been demanded to be saved.

SUMMARY

An object of the present technology is to provide a vehicular door trim having a simple mounting structure with which a mounting process can be performed easily. Another object of the present technology is to provide a vehicular door trim that can increase mounting strength and save mounting spaces.

A vehicular door trim according to the technology described herein includes an armrest, a pull handle, an opening section, and a switch base. The armrest includes a first mount member. The pull handle includes a body portion and an extending portion. The extending portion extends from the body portion and includes a second mount member that is fitted to the first mount member. The opening section is defined by the armrest and the extending portion with the second mount member being fitted to the first mount member. The switch base includes a third mount member that is fitted to the second mount member and disposed in the opening section to cover the opening section with the third mount member being fitted to the second mount member.

DETAILED DESCRIPTION

Embodiment

Figure 1:
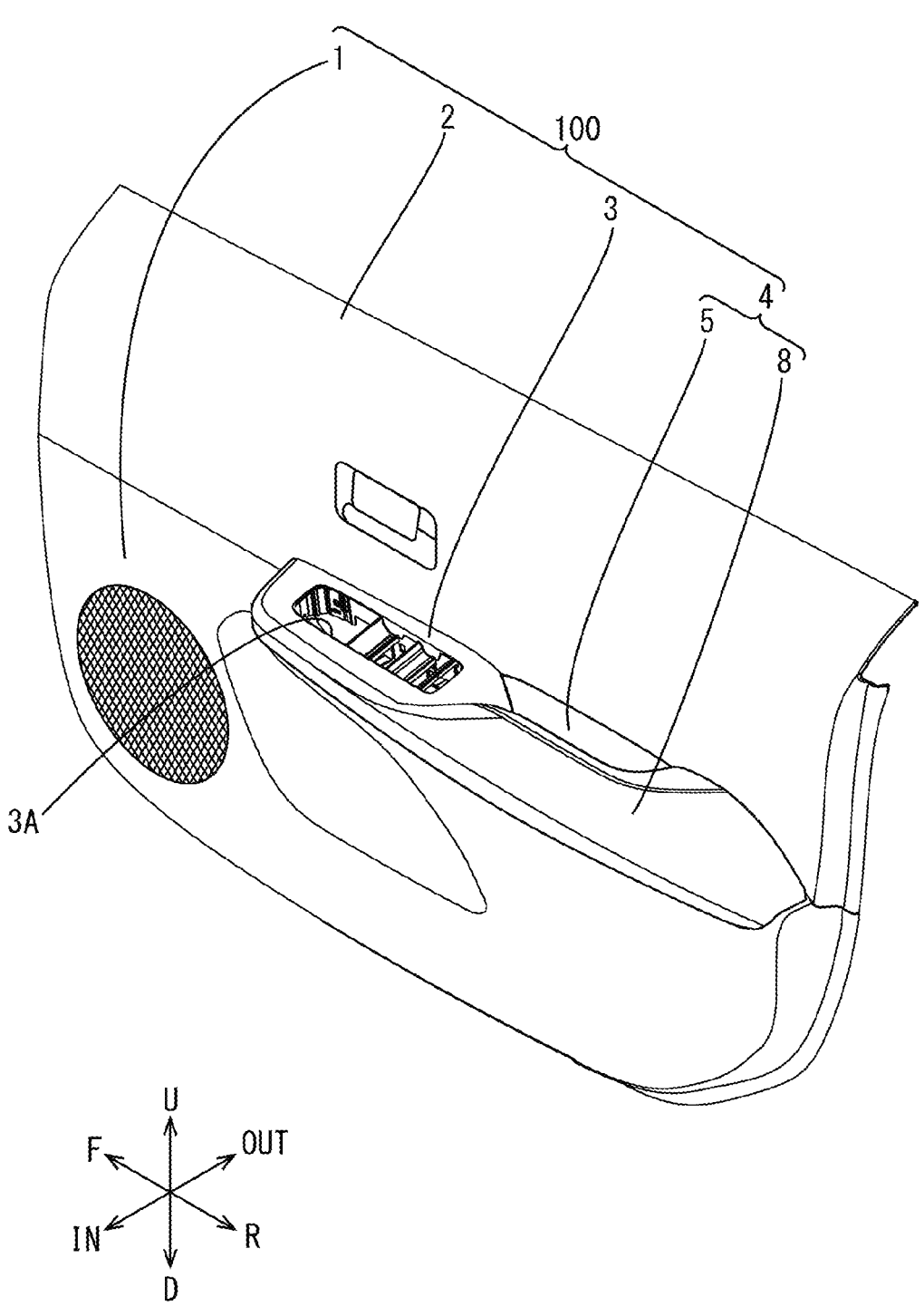
FIG. 1 is a perspective view of a door trim according to one embodiment.

One embodiment of the present technology will be described with reference to FIGS. 1 to 10. A door trim 100 (a vehicular door trim) according to this embodiment is mounted on a door panel, which is a metal plate and forms an outer shape of a door, from a vehicular interior side. Arrows F, R, U, D, IN, and OUT represent a vehicular front side, a vehicular rear side, an upper side, a bottom side, a vehicular interior side, and a vehicular exterior side, respectively, in the drawings.

Figure 2:
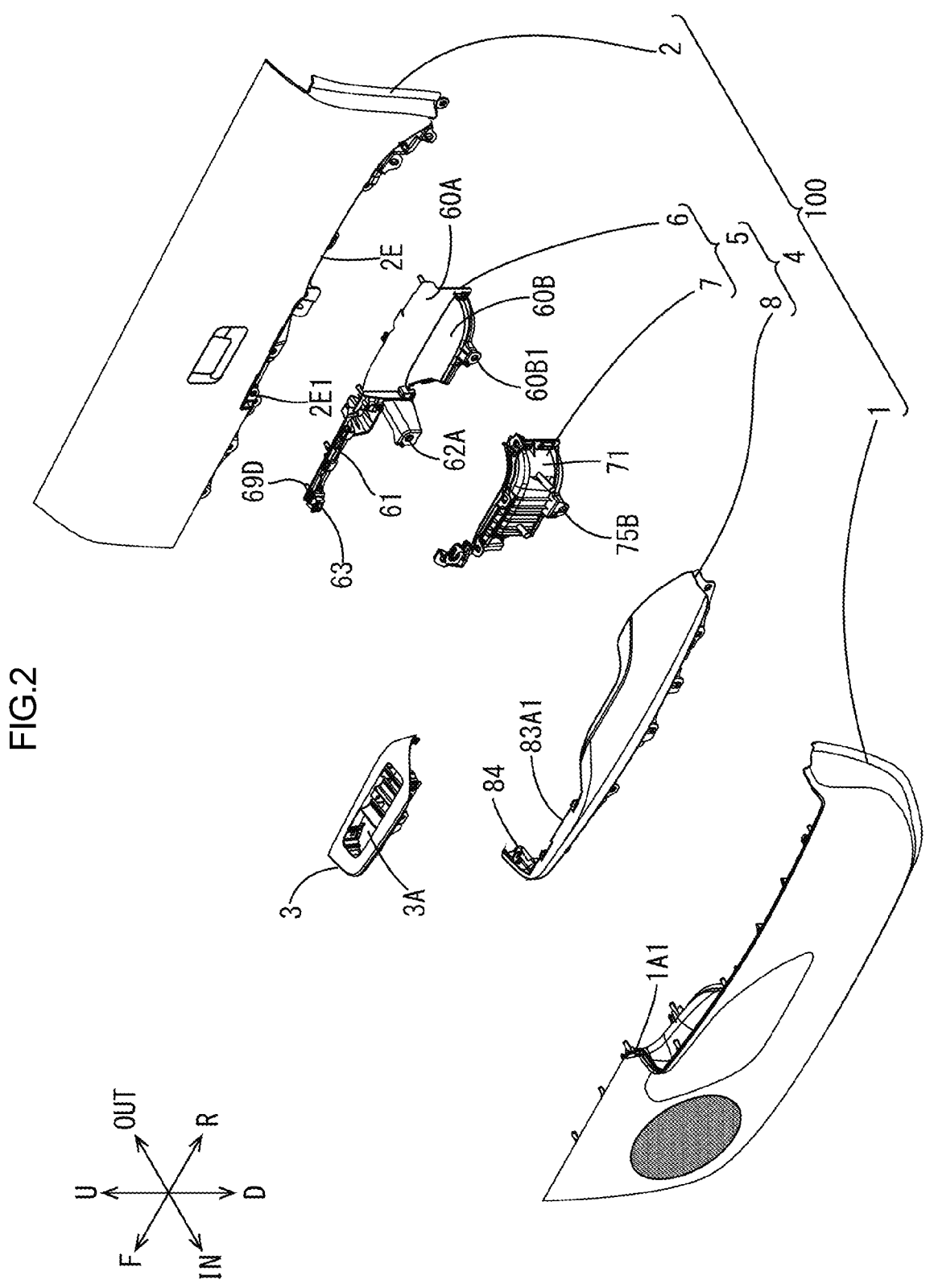
FIG. 2 is an exploded perspective view of the door trim.

As illustrated in FIGS. 1 and 2, the door trim 100 includes a lower board 1, which is a plate member, an upper board 2 (a trim portion), an armrest 8, a pull handle 5, and a switch base 3. The upper board 2 is a plate member and mounted on the lower board 1 from the upper side and a vehicular exterior side. The armrest 8 projects from a lower edge portion 2E toward a vehicular interior side and a passenger puts his or her arm on the armrest 8. The pull handle 5 is disposed between the armrest 8 and the lower edge portion 2E of the upper board 2 and the passenger can put his or her fingers in the pull handle 5 to open and close the door. The switch base 3 is a plate member and includes a switch hole 3A in which switches (an operation portion) is mounted.

Figure 3:
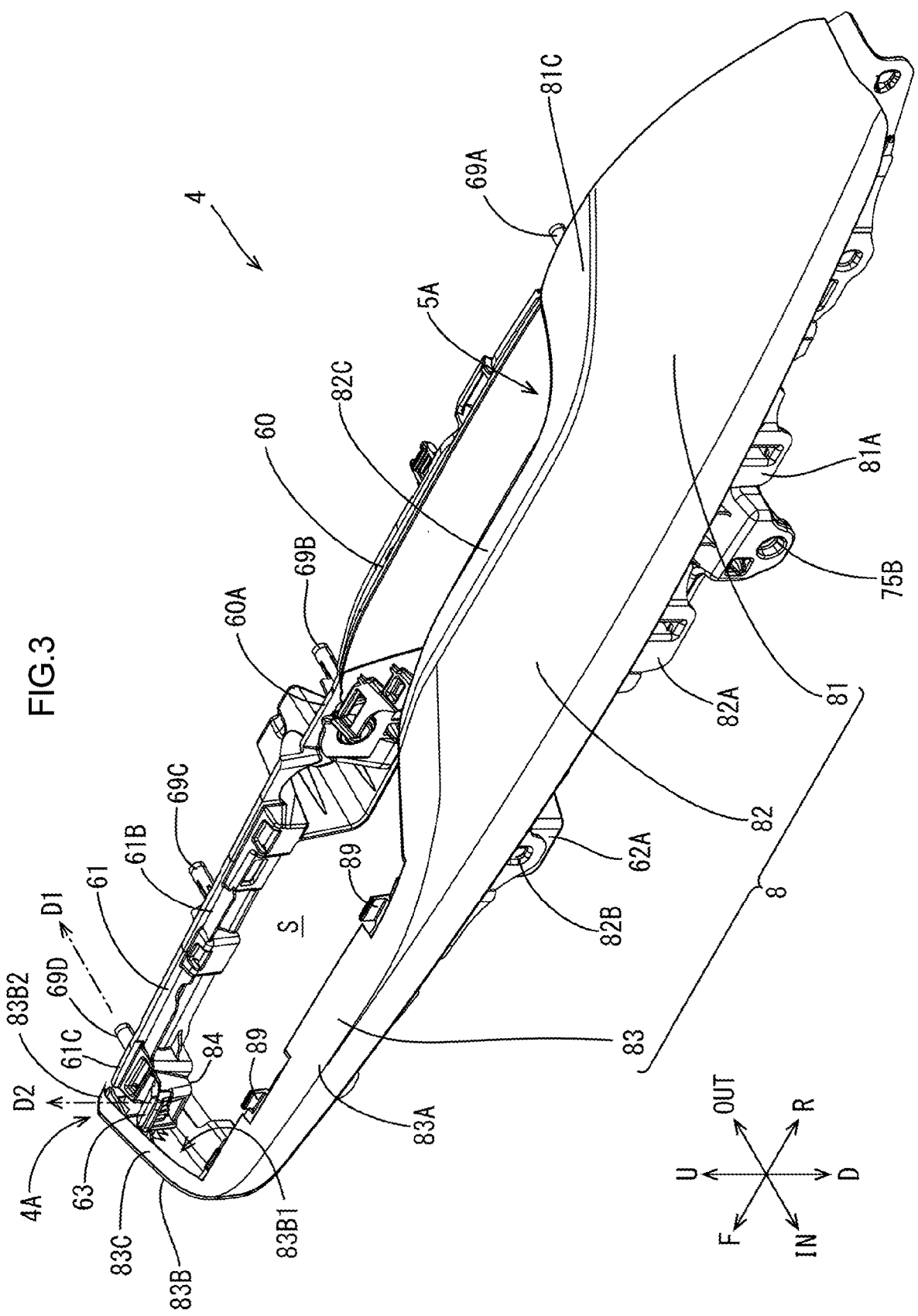
FIG. 3 is a perspective view of a mount member.

As illustrated in FIGS. 1 to 3, the pull handle 5 includes an outer member 6 and an inner member 7. The inner member 7 is disposed on the vehicular interior side with respect to the outer member 6 and attached to the outer member 6 from the vehicular interior side. The inner member 7 is a curved plate member that is curved to project toward the vehicular interior side. With the inner member 7 being attached to the outer member 6 from the vehicular interior side, the pull handle 5 is configured to have a recessed portion 5A as illustrated in FIG. 3. The outer member 6 includes a bottom portion 60B as a bottom of the recessed portion 5A.

The armrest 8 includes a first mount member 84 at a front end and the outer member 6 includes a second mount member 63 at a front end. As illustrated in FIG. 3, with the second mount member 63 being fitted to the first mount member 84 from the lower side in a mounting direction D2 (a first direction), which is perpendicular to a direction D1 (a second direction), the armrest 8 and the pull handle 5 that is attached to the armrest 8 are configured as a mount member 4. The mount member 4 is mounted on the lower board 1 from the vehicular exterior side. The pull handle 5 includes a boss 69D as a fourth mount member at a front end. With the boss 69D (the fourth mount member) being inserted in a hole 2E1 (a fifth mount member) in the lower edge portion 2E of the upper board 2 from the vehicular interior side, the mount member 4 that is mounted on the lower board 1 is mounted on the upper board 2 from the vehicular interior side (in the direction D1 in FIG. 3). Thus, the mount member 4 is fixed to the lower board 1 and the upper board 2 so as to be held between the lower board 1 and the upper board 2.

The operation of joining the pull handle 5 and the armrest 8 and obtaining the mount member 4 is referred to as a first mounting operation. After the first mounting operation, that is in a first mount state, the pull handle 5 and the armrest 8 are joined together and the mount member 4 obtained after the first mounting operation is a sub assembly. The operation of mounting the mount member 4 and the upper board 2 on the lower board 1 is referred to as a second mounting operation. After the second mounting operation, that is in a second mount state, the mount member 4 and the upper board 2 are sequentially mounted on the lower board 1. The operation of mounting a structural member in the second mount state (obtained by the second mounting operation) on a door panel from the vehicular interior side is referred to as a third mounting operation. After the third mounting operation, that is in a third mount state, the lower board 1, the upper board 2, and the mount member 4, which are joined together, are mounted on the door panel. The operation of mounting the switch base 3 on the structural member obtained after the third operation is referred to as a fourth mounting operation. The door trim 100 is obtained after the fourth mounting operation, that is in a fourth mount state. In the fourth mounting operation, a harness of a power window is pulled out through an opening section S toward the vehicular interior side from a door panel side (the vehicular exterior side of the mount member 4). The harness is connected to the switch base 3 (more specifically, a switch to be mounted on the switch base 3) and the opening section S is covered with the switch base 3. Thus, the door trim 100 is produced.

Figure 4:
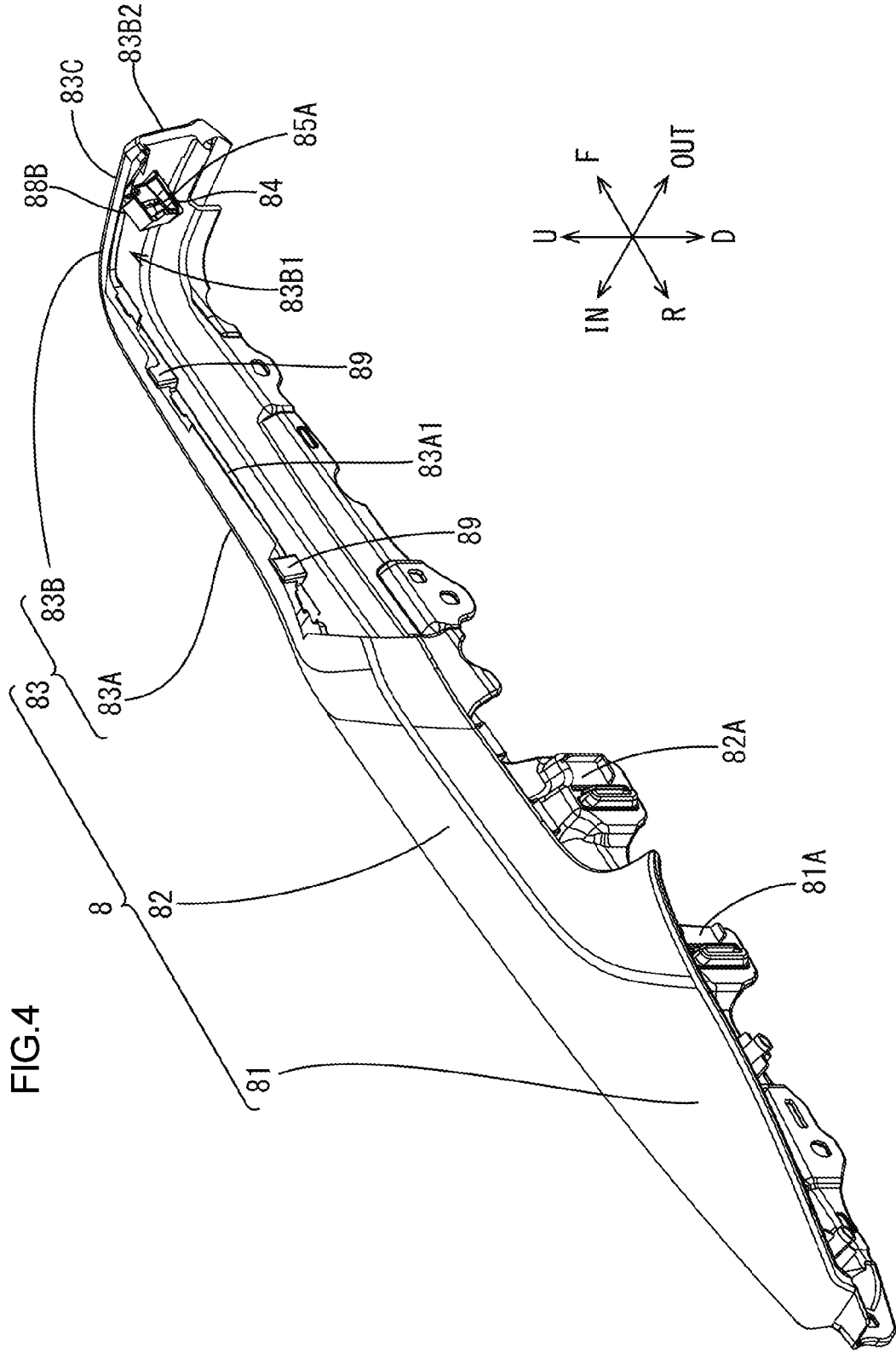
FIG. 4 is a perspective view of an armrest.
Figure 5:
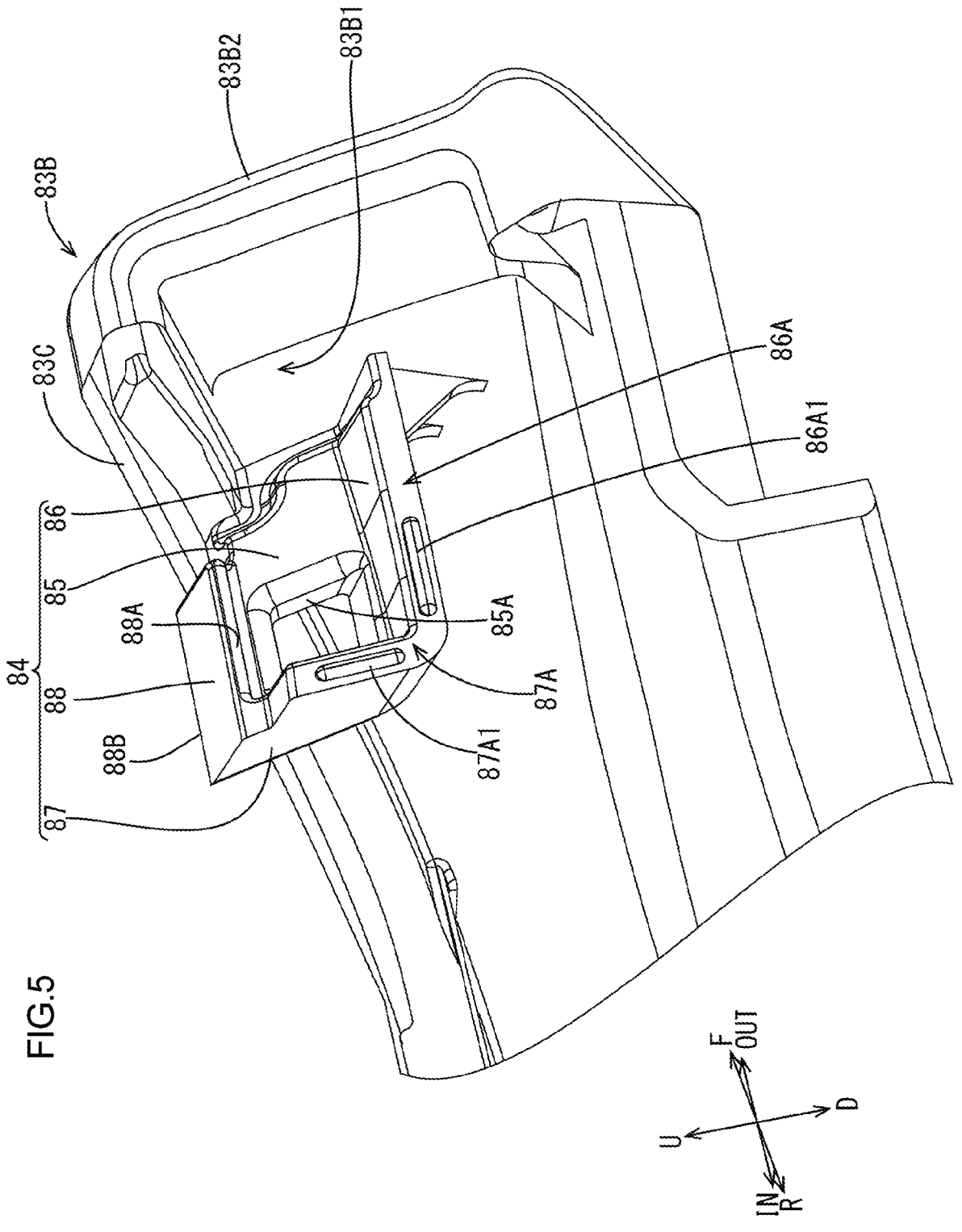
FIG. 5 is a perspective view of a portion of the armrest including a first mount member seen from a vehicular exterior lower side.

As illustrated in FIGS. 3 to 5, the armrest 8 includes a rear portion 81, a middle portion 82, and a front portion 83. The middle portion 82 is in front of the rear portion 81 and has a length (width) extending in a vehicular interior-exterior direction (a vehicular width direction) smaller than that of the rear portion 81. Namely, the middle portion 82 is narrower than the rear portion 81. The front portion 83 is in front of the middle portion 82 and has a length (width) extending in the vehicular interior-exterior direction smaller than that of the middle portion 82. Namely, the front portion 83 is narrower than the middle portion 82. The rear portion 81 includes a plate piece 81A and the middle portion 82 includes plate pieces 82A, 82B. The plate pieces 81A, 82A, 82B extend downward from vehicular interior side edges of the rear portion 81 and the middle portion 82. As illustrated in FIG. 1, the upper board 2 extends upward from a vehicular exterior side edge of the rear portion 81. As illustrated in FIG. 3, the recessed portion 5A is on the vehicular exterior side of the middle portion 82 and the recessed portion 5A includes the bottom portion 60B as the bottom.

The front portion 83 includes an armrest extending portion 83A and a front wall 83B. The armrest extending portion 83A extends frontward from a front end of the middle portion 82. The front wall 83B extends toward the vehicular exterior side from a front end of the armrest extending portion 83A and is configured as a front wall of the armrest 8. The front wall 83B extends in the vehicular width direction. The armrest extending portion 83A includes projections 89 on a vehicular exterior side edge. The projections 89 are fitted in mount portions of the switch base 3. The armrest 8 includes the first mount member 84 that projects rearward (into the opening section S) from a back surface 83B1 of the front wall 83B. The first mount member 84 is tapered upward. In the second mount state, a distal end portion 83B2 of the front wall 83B is in contact with (or closer to) the lower edge portion 2E of the upper board 2 and a corner portion 1A1 of the lower board 1.

As illustrated in FIGS. 4 and 5, the first mount member 84 is closer to an upper edge 83C of the back surface 83B1 of the front wall 83B than the middle of the back surface 83B1 with respect to an upper-bottom direction. The first mount member 84 includes an upper projecting wall 85 (wall portion) and a lower projecting wall 86 (first wall portion) that project rearward and vertically from the back surface 83B1 of the front wall 83B. The lower projecting wall 86 is a plate member having a width extending in the vehicular interior-exterior direction (the vehicular width direction). The lower projecting wall 86 is inclined upward as it extends toward the vehicular interior side. The upper projecting wall 85 extends upward from a vehicular interior side edge of the lower projecting wall 86 and extends in the upper-bottom direction. The upper projecting wall 85 has plate surfaces that face the vehicular interior side and the vehicular exterior side and includes a through hole 85A that is through from one of the plate surfaces to another one. The lower projecting wall 86 extends toward the vehicular exterior side from a lower edge of the upper projecting wall 85. The lower projecting wall 86 has plate surfaces that face the upper and lower sides. The lower projecting wall 86 includes a projection 86A1 (first contact projection) that projects toward the vehicular exterior side from a vehicular exterior-side edge surface 86A. The projection 86A1 extends in the vehicular front-rear direction. The upper projecting wall 85 includes the through hole 85A that is through a thickness direction of the upper projecting wall 85 (the vehicular width direction) and is a rectangular hole.

Figure 9:
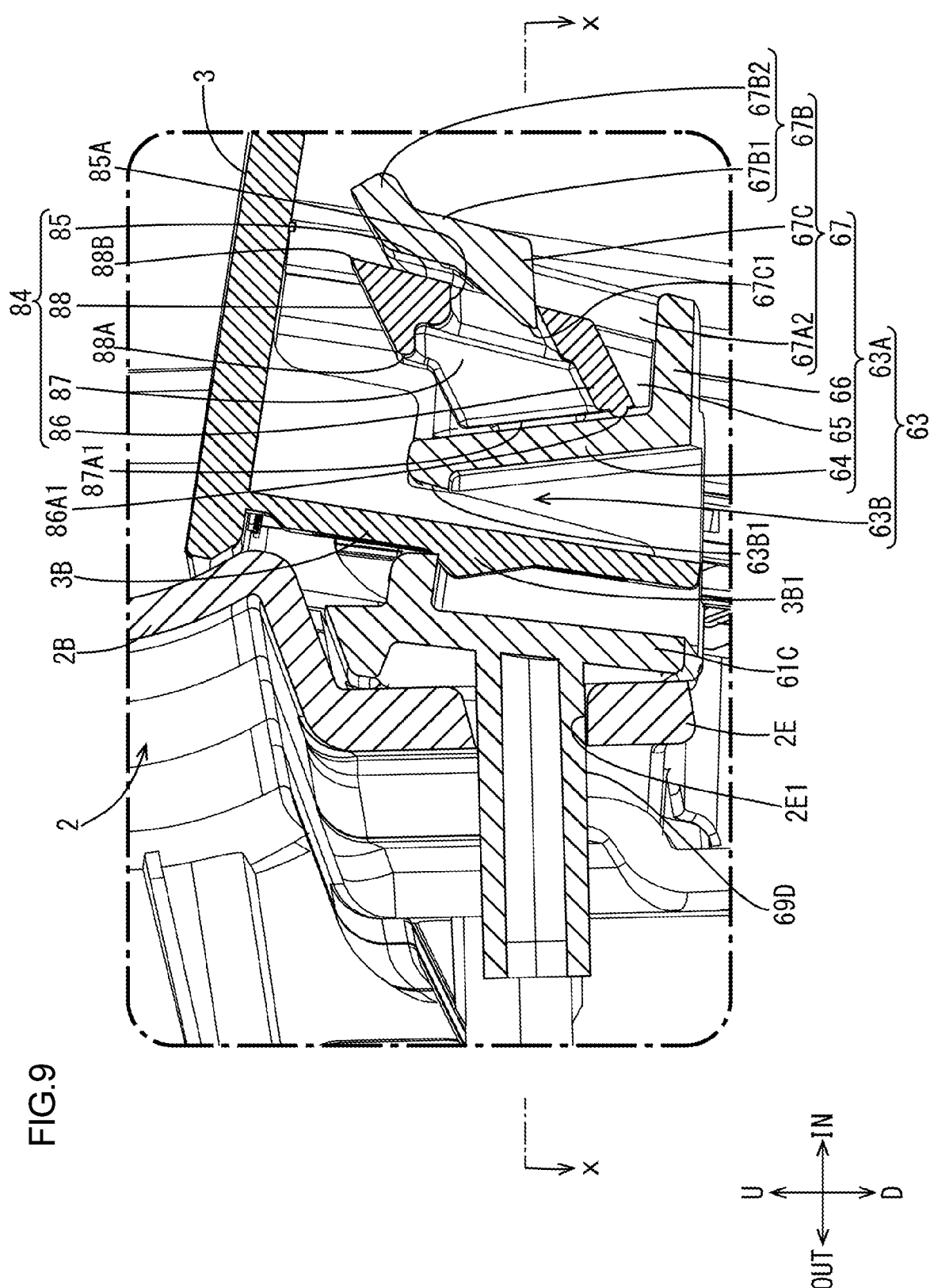
FIG. 9 is a cross-sectional view illustrating mount members that are joined together.

As illustrated in FIGS. 5 and 9, the first mount member 84 further includes a rear wall 87 (second wall portion) and a sloped wall 88. The rear wall 87 extends from a vehicular rear edge of the upper projecting wall 85 toward the vehicular exterior side. The rear wall 87 has a lower edge that is connected to a vehicular rear edge of the lower projecting wall 86. The sloped wall 88 extends toward the vehicular exterior side from an upper edge of the upper projecting wall 85. The sloped wall 88 is sloped upward as it extends toward the vehicular interior side. The rear wall 87 includes a projection 87A1 (second contact projection) that projects toward the vehicular exterior side from a vehicular exterior-side edge surface 87A. The projection 87A1 extends in the upper-bottom direction. The sloped wall 88 extends toward the vehicular exterior side such that a lower edge portion 88A of the sloped wall 88 is more to the vehicular exterior side than the upper projecting wall 85. As illustrated in FIG. 9, the lower edge portion 88A has a hook shape that extends downward and toward the vehicular exterior side from the upper edge of the upper projecting wall 85. As illustrated in FIGS. 4 and 5, the sloped wall 88 extends such that an upper edge 88B of the sloped wall 88 is at a same height as the upper edge 83C of the front wall 83B or higher than the upper edge 83C.

Figure 6:
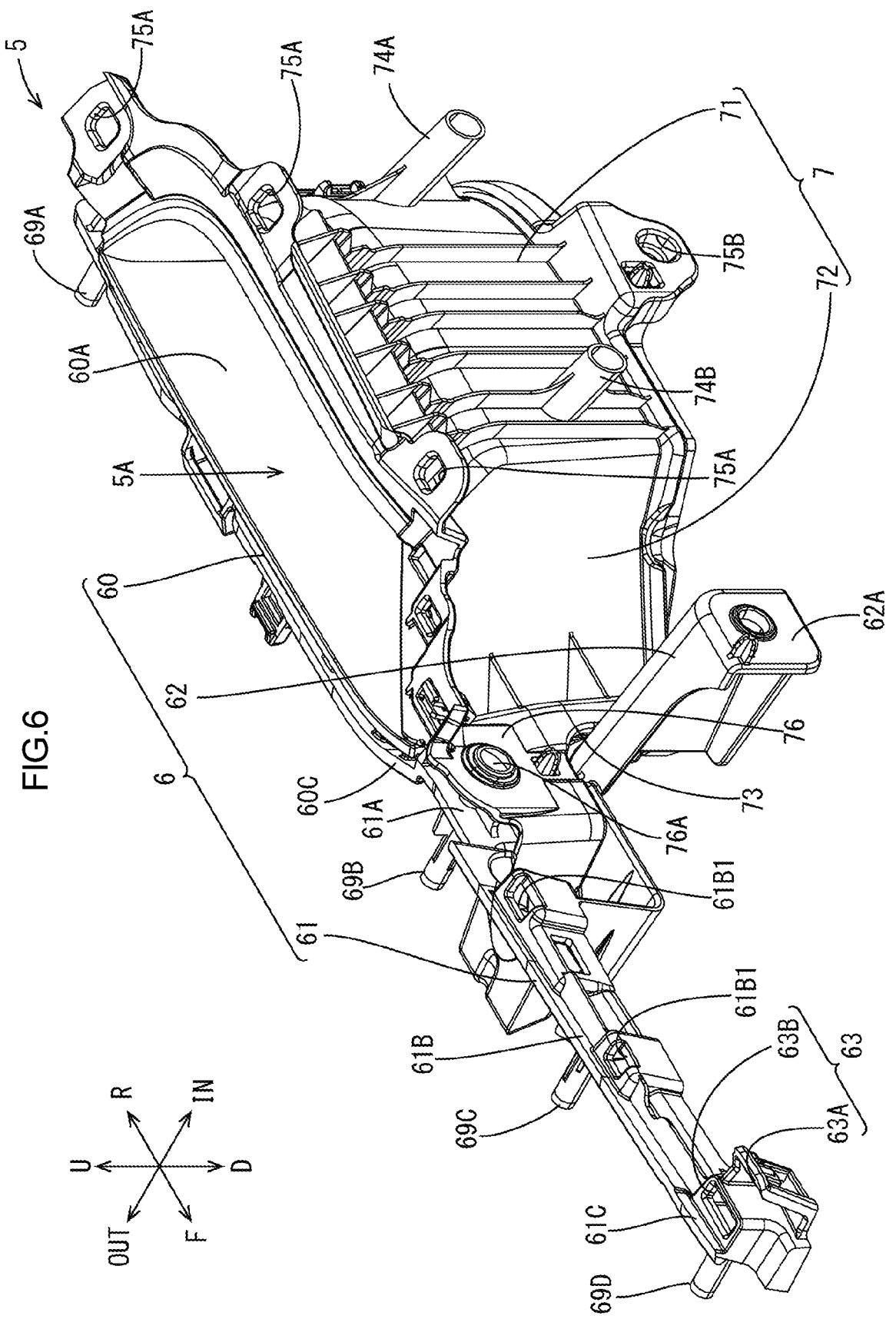
FIG. 6 is a perspective view of a pull handle seen from a vehicular interior upper side.

As illustrated in FIGS. 2 and 6, the inner member 7 of the pull handle 5 includes a body plate portion 71 and a sloped plate portion 72. The body plate portion 71 is curved in a J-shape seen from above. The sloped plate portion 72 is in front of the body plate portion 71 and is sloped toward the vehicular exterior side as it extends frontward. The inner member 7 further includes contact portions 74A, 74B, upper holes 75A, a lower hole 75B, an L-shaped edge portion 73, and a mount portion 76. The contact portions 74A, 74B project from the body plate portion 71 toward the vehicular interior side with being inclined downward and have a columnar shape. The upper holes 75A and the lower hole 75B are included in an upper section and a lower section of the inner member 7, respectively. The L-shaped edge portion 73 is at a front lower section of the sloped plate portion 72. The mount portion 76 is above the L-shaped edge portion 73 and includes a hole. The mount portion 76 is attached to the outer member 6 from the vehicular interior side with using a fixing member 76A such as a clip via the hole. With the pull handle 5 being mounted on the armrest 8, as illustrated in FIG. 3, the contact portions 74A, 74B are contacted with back surfaces (vehicular exterior side surfaces) of the plate pieces 81A, 82A of the armrest 8 from the vehicular exterior side, respectively. The plate portions having the upper holes 75A are contacted with back surfaces (lower surfaces) of vehicular exterior side edge portions 81C, 82C of the rear portion 81 and the middle portion 82 of the armrest 8 from below. A columnar boss on the back surface of the lower board 1 is inserted through the lower hole 75B and a hole 60B1 (refer FIG. 2) of the outer member 6 and the mount member 4 is mounted on the lower board 1.

As illustrated in FIGS. 2 and 6, the outer member 6 of the pull handle 5 includes a body portion 60, an extending portion 61, and a mount base 62. The extending portion 61 is a thin elongated plate member and extends frontward from a front end portion 60C of the body portion 60. The mount base 62 projects from a lower portion of the front end portion 60C toward the vehicular interior side. The outer member 6 includes bosses 69A, 69B, 69C, 69D that have a columnar shape and project respectively from back surfaces of an upper rear portion of the body portion 60, a rear end portion 61A, a middle portion 61B, and a front end portion 61C of the extending portion 61. The bosses 69A, 69B, 69C, 69D are inserted in holes in the lower edge portion 2E of the upper board 2 and projecting ends of the bosses 69A, 69B, 69C, 69D are deformed with being heated or pressed to fix the pull handle 5 to the upper board 2. The body portion 60 includes a body plate portion 60A and the bottom portion 60B (refer to FIG. 2). The body plate portion 60A extends in the vehicular front-rear direction and is curved to project toward the vehicular interior side as it extends frontward. The bottom portion 60B is a plate member that extends from the lower edge of the body plate portion 60A toward the vehicular interior side and is configured as the bottom of the recessed portion 5A. The body plate portion 60A and the bottom portion 60B of the outer member 6 and the body plate portion 71 and the sloped plate portion 72 of the inner member 7 define the recessed portion 5A of the pull handle 5.

The mount base 62 projects from a front lower section of the L-shaped edge portion 73 of the inner member 7 toward the vehicular interior side. The mount base 62 includes a through hole in an end surface 62A of the mount base 62. As illustrated in FIG. 3, the end surface 62A is contacted with a back surface of the plate piece 82B of the armrest 8 from the vehicular exterior side. The plate piece 82B includes a through hole. A columnar boss that projects from a back surface of the lower board 1 toward the vehicular exterior side is inserted through the through holes of the plate piece 82B and the end surface 62A. Thus, the mount member 4 is mounted on the lower board 1.

Figure 10:
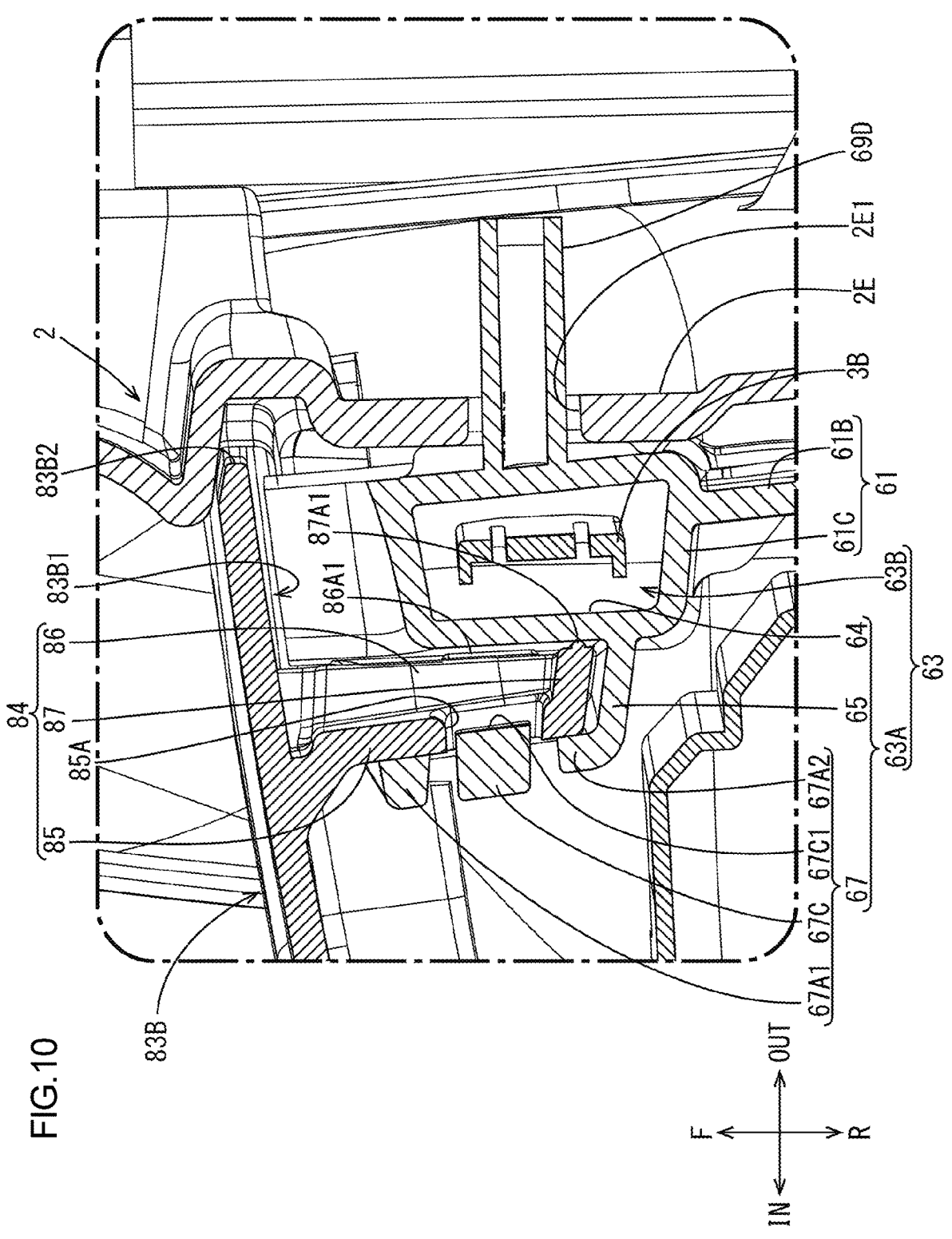
FIG. 10 is a cross-sectional view illustrating the mount members that are joined together and taken along X-X line in FIG. 9.

The extending portion 61 includes the rear end portion 61A, the middle portion 61B, and the front end portion 61C. The extending portion 61 includes two holes 61B1 in a vehicular interior-side portion of the middle portion 61B, the second mount member 63 on a vehicular interior-side portion of the front end portion 61C, and the boss 69D (the fourth mount member) on a vehicular exterior-side portion of the front end portion 61C. The second mount member 63 is to be fitted to the first mount member 84. The boss 69D is to be fitted to the lower edge portion 2E (refer to FIG. 2) of the upper board 2. By inserting projections projecting from a lower surface of the switch base 3 into the two holes 61B1, the switch base 3 is mounted on the pull handle 5. The boss 69D is on a vehicular exterior side with respect to an outer fitting portion 63B which will be described later. The outer fitting portion 63B is a portion of the second mount member 63 that is to be fitted to a projection 3B (a third mount member) of the switch base 3 (refer to FIGS. 9 and 10). As illustrated in FIGS. 2, 9 and 10, the boss 69D is inserted in the hole 2E1 in the lower edge portion 2E of the upper board 2 from the vehicular interior side (along the direction D1 in FIG. 3) and the distal end of the boss 69D is deformed with heat or pressure to be fixed to the lower edge portion 2E. Thus, the mount member 4, which is mounted on the lower board 1, is fixed to the upper board 2 and the obtained structural member is in the second mount state.

Figure 7:
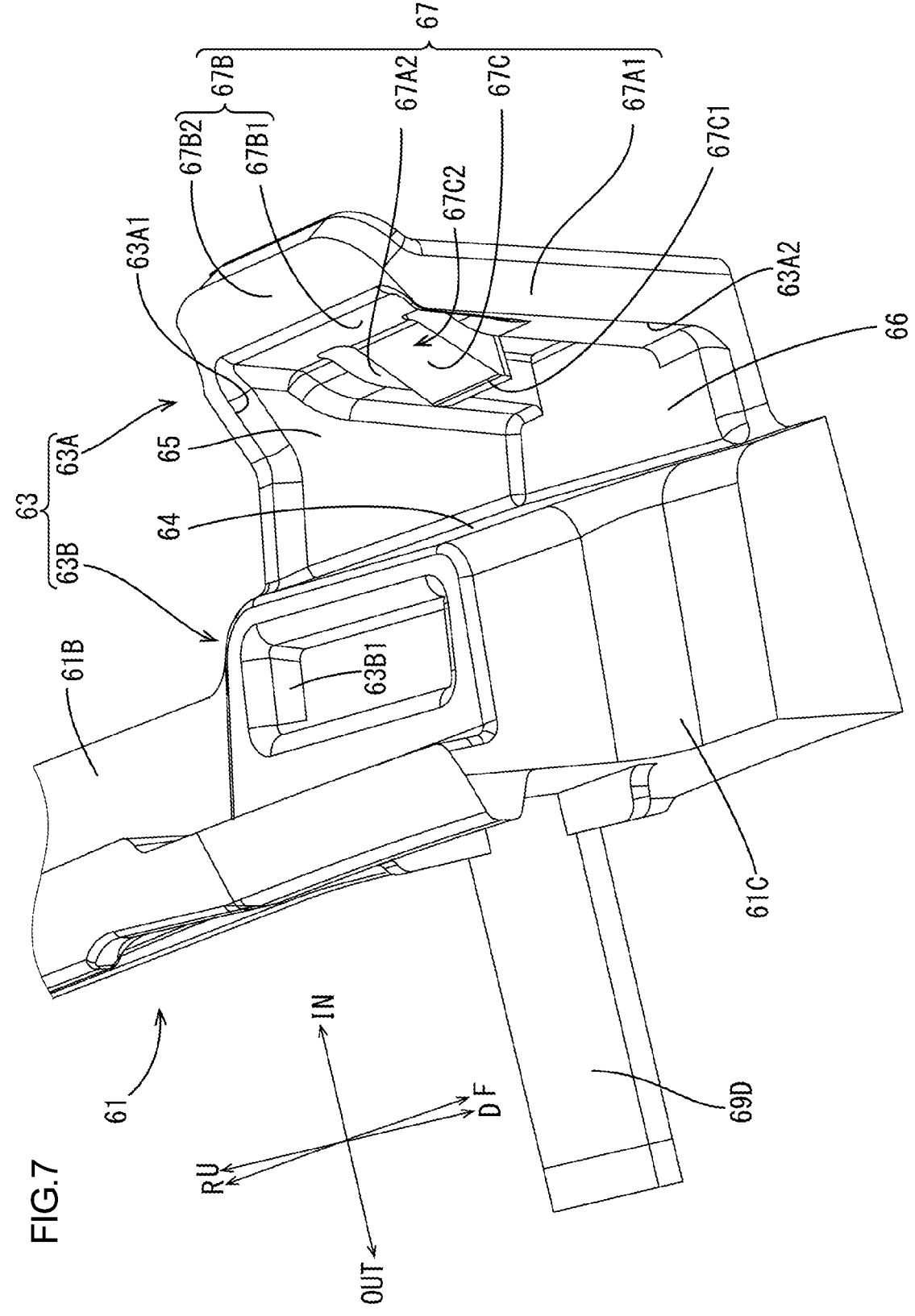
FIG. 7 is a perspective view of a portion of the pull handle including a second mount member seen from a front upper side.
Figure 8:
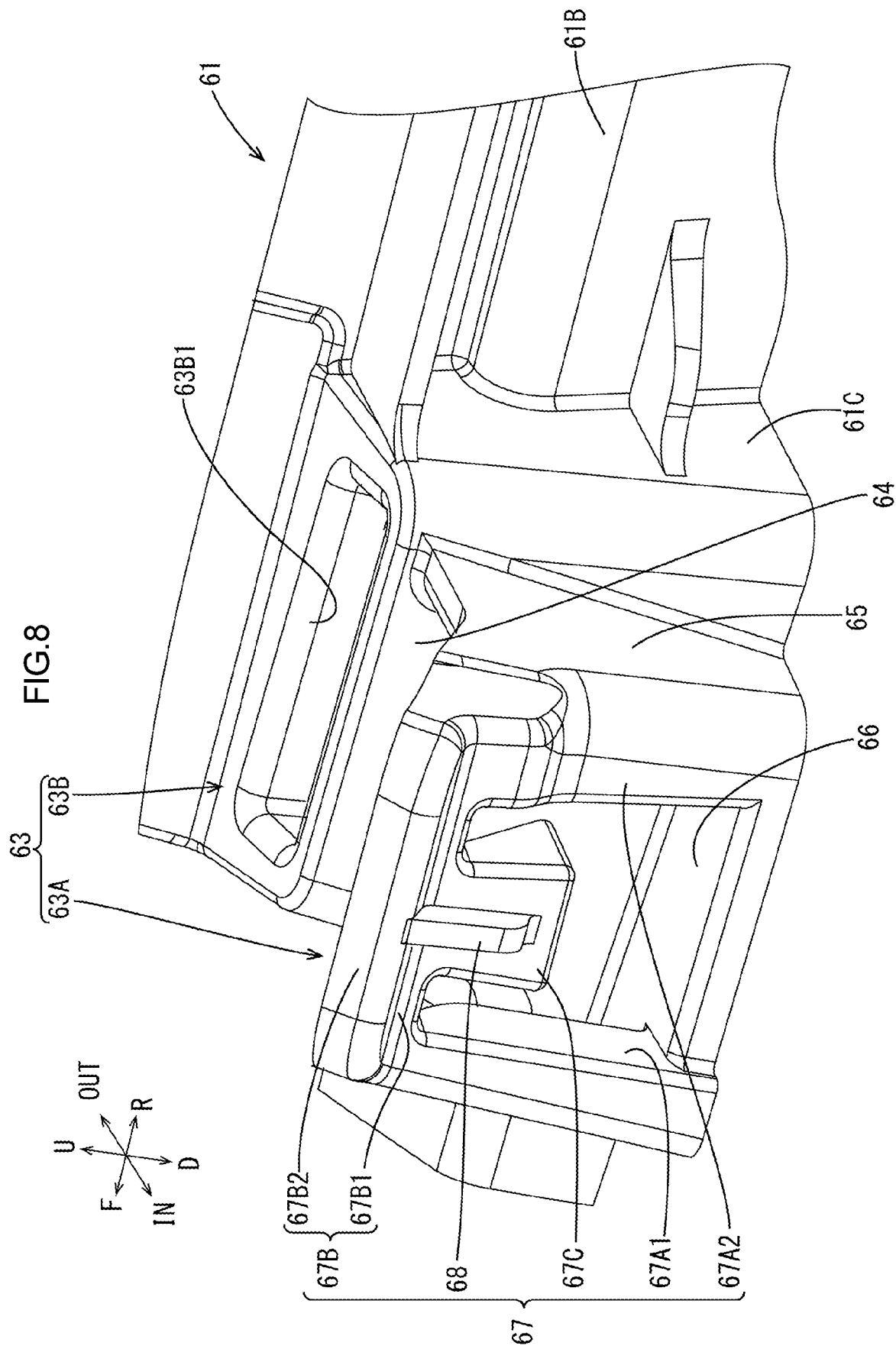
FIG. 8 is a perspective view of the portion of the pull handle including the second mount member seen from a vehicular interior and rear side.

As illustrated in FIGS. 7 and 8, the second mount member 63 includes an inner fitting portion 63A (a first fitting portion) and the outer fitting portion 63B (a second fitting portion). The inner fitting portion 63A is to be fitted to the first mount member 84. The outer fitting portion 63B is on the vehicular exterior side of the inner fitting portion 63A and is to be fitted to the projection 3B (the third mount member) of the switch base 3 (refer to FIGS. 9 and 10). The outer fitting portion 63B includes a mount hole 63B1 that is through an upper section of the outer fitting portion 63B in the upper-bottom direction. The mount hole 63B1 is a rectangular hole elongated in the vehicular front-rear direction.

As illustrated in FIGS. 7 and 8, the inner fitting portion 63A includes a separation wall 64, a bottom wall 66, a side wall 65, and an inner wall 67. The separation wall 64 extends downward from the upper section of the outer fitting portion 63B that includes the mount hole 63B1. The separation wall 64 is inclined toward the vehicular interior side as it extends downward. The bottom wall 66 is a plate member and extends from a lower edge of the separation wall 64 toward the vehicular interior side. The side wall 65 is a plate member and extends from a vehicular rear side edge of the separation wall 64 toward the vehicular interior side. The inner wall 67 is disposed on the vehicular interior side of the separation wall 64 to be opposite the separation wall 64. The inner fitting portion 63A includes an upper fitting hole 63A1 that is defined by the separation wall 64, the side wall 65, and the inner wall 67 and opens upward. The inner fitting portion 63A further includes a front fitting hole 63A2 that is defined by the separation wall 64, the bottom wall 66, and the inner wall 67 and opens frontward. The inner fitting portion 63A includes a space between the separation wall 64 and the inner wall 67. The first mount member 84 is fitted to the inner fitting portion 63A through the upper fitting hole 63A1 and the front fitting hole 63A2. Thus, the first mount member 84 is fitted in the space along the walls of the second mount member 63.

The inner wall 67 includes front wall portions 67A1, 67A2, a connection portion 67B, and a fitting portion 67C. The front wall portions 67A1, 67A2 have a columnar shape and extend upward from a vehicular interior side edge of the bottom wall 66. The front wall portions 67A1, 67A2 are inclined slightly toward the vehicular interior side as they extend upward. The connection portion 67B connects upper end portions of the front wall portions 67A1, 67A2. The fitting portion 67C is disposed between the front wall portion 67A1 and the front wall portion 67A2 and extends downward from a middle section of the connection portion 67B with respect to the vehicular front-rear direction. The fitting portion 67C has a triangular shape seen from the vehicular front side. The fitting portion 67C projects toward the vehicular exterior side. The front wall portion 67A2 that is disposed on the vehicular rear side is connected to the side wall 65.

The connection portion 67B includes a connection lower portion 67B1 and an inner wall edge portion 67B2. The inner wall edge portion 67B2 extends obliquely upward from the connection lower portion 67B1 and is configured as a distal edge portion of the inner wall 67. The inner wall edge portion 67B2 is inclined toward the vehicular interior side as it extends upward. The inner wall edge portion 67B2 is inclined such that a distal end of the inner wall edge portion 67B2 is more to the vehicular interior side than the front wall portions 67A1, 67A2 and the connection lower portion 67B1. The fitting portion 67C has an opposite surface 67C2 (a vehicular exterior side surface) that is opposite the separation wall 64. The fitting portion 67C is configured such that the opposite surface 67C2 is sloped toward the separation wall 64 as it extends downward. Therefore, as illustrated in FIG. 7, a lower end portion 67C1 of the fitting portion 67C projects toward the vehicular exterior side than the front wall portions 67A1, 67A2 and the connection portion 67B. As illustrated in FIG. 8, the inner wall 67 includes a rib 68 that projects from a vehicular interior side surface of the fitting portion 67C. The rib 68 extends from the inner wall edge portion 67B2 to the fitting portion 67C via the connection lower portion 67B1.

A process of joining the pull handle 5, the armrest 8, and the switch base 3 will be described. The pull handle 5 is moved to closer to the armrest 8 such that the second mount member 63 is disposed below the first mount member 84. Then, by moving the pull handle 5 upward and closer to the armrest 8, the second mount member 63 is moved upward and closer to the first mount member 84 and the second mount member 63 is fitted to the first mount member 84 from below. Then, the pull handle 5 and the armrest 8 are joined together and are in the first mount state. Namely, the second mount member 63 is moved in the mounting direction D2 (the first direction) that crosses the direction D1 as illustrated in FIG. 3. When the second mount member 63 is fitted to the first mount member 84, the first mount member 84 is inserted in a space between the separation wall 64 and the inner wall 67 as illustrated in FIGS. 9 and 10. With the second mount member 63 being moved closer to the first mount member 84 from a lower side, the opposite surface 67C2 of the fitting portion 67C is contacted with a lower surface of the lower projecting wall 86 and the fitting portion 67C is pushed by the lower projecting wall 86 and elastically deformed toward the vehicular interior side. As the second mount member 63 is further moved upward, the lower end portion 67C1 of the fitting portion 67C is fitted in the through hole 85A of the upper projecting wall 85 and elastically restores its original shape. Namely, as illustrated in FIG. 9, the lower end portion 67C1 is stopped by a hole edge of the through hole 85A and is contacted with the hole edge of the through hole 85A. Thus, the inner fitting portion 63A is fitted to the first mount member 84. The first mount member 84 can be held by the second mount member 63 firmly.

In the first mount state in which the second mount member 63 is fitted to the first mount member 84, as illustrated in FIG. 9, the lower projecting wall 86 is disposed above the bottom wall 66 and the projection 86A1 is contacted with the opposite surface of the separation wall 64 from the vehicular interior side. The opposite surface of the separation wall 64 is opposite the fitting portion 67C. As illustrated in FIG. 10, the rear wall 87 is disposed in front of the side wall 65 and the projection 87A1 of the rear wall 87 is contacted with the opposite surface of the separation wall 64 from the vehicular interior side. According to such a configuration, the first mount member 84 can be fitted to the second mount member 63 firmly and stably. As illustrated in FIG. 3, with the first mount member 84 and the second mount member 63 are fitted together and being in the first mount state, the first mount member 84 and the second mount member 63 are disposed at a corner portion 4A of the mount member 4 that is a vehicular exterior side portion and a front upper portion of the mount member 4. The first mount member 84 is fitted in the space between the separation wall 64 and the inner wall 67 with being in contact with the separation wall 64 and the inner wall 67. According to such a configuration, the first mount member 84 can be held by the second mount member 63 firmly.

As illustrated in FIG. 3, with the first mount member 84 and the second mount member 63 being fitted together and in the first mount state, the opening section S that is open in the upper-bottom direction is formed in the front section of the mount member 4. The opening section S is defined by the extending portion 61 of the outer member 6 of the pull handle 5 and the armrest extending portion 83A of the front portion 83 of the armrest 8. The opening section S is a space between the extending portion 61 and the armrest extending portion 83A. As illustrated in FIGS. 9 and 10, the switch base 3 includes the projection 3B (the third mount member) that projects downward from a lower surface of the vehicular exterior edge portion of the switch base 3. As illustrated in FIG. 9, the projection 3B includes a stopper projection 3B1 that projects from a vehicular exterior side surface of the projection 3B. With the projection 3B being inserted in the mount hole 63B1 of the outer fitting portion 63B of the second mount member 63, the stopper projection 3B1 is stopped at a hole edge of the mount hole 64B1. Thus, the projection 3B of the switch base 3 is fixed to the second mount member 63. By fitting the projection 3B to the second mount member 63, the switch base 3 is mounted on the mount member 4, which is in the second state or the third state, to cover the opening section S as illustrated in FIG. 1.

The door trim 100 according to this embodiment includes the armrest 8, the pull handle 5, and the switch base 3. The armrest 8 includes the first mount member 84. The pull handle 5 includes the body portion 60 and the extending portion 61 that extends from the body portion 60. The extending portion 61 includes the second mount member 63 that is to be fitted to the first mount member 84. With the first mount member 84 and the second mount member 63 being fitted together, the opening section S is defined by the armrest 8 and the extending portion 61. The switch base 3 includes the projection 3B (the third mount member) that is fitted to the second mount member 63. With the projection 3B (the third mount member) being fitted to the second mount member 63 that is fitted to the first mount member 84, the opening section S is covered with the switch base 3.

According to such a door trim 100, with the second mount member 63 being fitted to the first mount member 84, the pull handle 5 is mounted on the armrest 8 and the mount member 4 including the armrest 8 and the pull handle 5 that are joined together is obtained. According to such a configuration, by mounting the mount member 4 on another component such as the lower board 1 and the upper board 2 of the door trim 100, the armrest 8 and the pull handle 5 can be collectively mounted on the component with a single operation. Furthermore, the mount member 4 including the armrest 8 and the pull handle 5 can be transported to a different place from the place where the mount member 4 is produced and the switch base 3 can be mounted on the mount member 4 in the different place to complete the production of the door trim 100.

The harness can be connected to the switch base 3, more specifically to switches to be mounted on the switch base 3, through the opening section S. Then, the projection 3B (the third mount member) is fitted to the second mount member 63 that is already fitted to the first mount member 84 such that the switch base 3 covers the opening section S. Thus, the door trim 100 is produced. Accordingly, the mounting operations of mounting the components can be performed smoothly and this reduces mounting works of the operator. Furthermore, the first mount member 84 and the projection 3B (the third mount member) are fitted to one mount member that is the second mount member 63. Therefore, the pull handle 5, the armrest 8, and the switch base 3 are joined at one portion. This improves mounting strength and saves the mounting space.

The second mount member 63 includes the inner fitting portion 63A that is fitted to the first mount member 84 and the outer fitting portion 63B that is fitted to the projection 3B (the third mount member).

According to such a configuration, with the second mount member 63 being fitted to the first mount member 84 and the projection 3B (third mount member) being fitted to the second mount member 63, the first mount member 84, the second mount member 63, and the third mount member are disposed in a small space with respect to the vehicular interior-exterior direction. This saves the mounting space. The separation wall 64 of the second mount member 63 can be elastically deformed toward the projection 3B (third mount member) when the second mount member 63 is fitted to the first mount member 84 and presses the separation wall 64 toward the vehicular exterior side. The separation wall 64 can be elastically deformed toward the first mount member 84, which is already fitted to the second mount member 63, when the projection 3B (third mount member) is fitted to the second mount member 63. Thus, force is applied to the mount members when the mount members are fitted together and therefore, the mount members are less likely to be released from each other. This increases the mounting strength.

The door trim 100 includes the upper board 2 (a trim portion) on which the pull handle 5 is mounted. The pull handle 5 includes the boss 69D (the fourth mount member) with which the pull handle 5 is mounted on the upper board 2 (the trim portion). The boss 69D (the fourth mount member) is on the vehicular exterior side with respect to the portion of the second mount member 63 that is fitted to the projection 3B (the third mount member).

According to such a configuration, a gap that may be created between contact portions of the components and the upper board 2 (the trim portion) can be reduced. Furthermore, this improves design. The first mount member 84, the second mount member 63, the projection 3B (third mount member), and the boss 69D (fourth mount member) can be collectively disposed in one small area. This can increase the mounting strength and effectively save the mounting space.

The first mount member 84 and the second mount member 63 are disposed at the corner portion 4A of the mount member 4 including the armrest 8 and the pull handle 5 that are fitted together.

According to such a configuration, a gap that may be created between the armrest 8 and the pull handle 5 can be further reduced. When the mount member 4 is mounted on another component such as the upper board 2 (the trim portion), a gap that may be created between a contact portion of the other component and the mount member 4 can be further reduced.

The door trim 100 includes the upper board 2 (the trim portion). The mount member 4 including the armrest 8 and the pull handle 5 that are fitted to each other is mounted on the upper board 2 in the direction D1. The second mount member 63 is fitted to the first mount member 84 in the second direction D2 that crosses the direction D1.

According to such a configuration, the mount members may have various shapes and the mounting strength can be increased and the mounting space can be reduced.

Other Embodiments

The technology described herein is not limited to the embodiment described above with reference to the drawings. The technical scope of the present disclosure may include the following embodiments and all modifications in the scope of claim or its equivalent scope.

(1) The shapes of the first mount member, the second mount member, the third mount member, and the fourth mount member are not particularly limited. The third mount member may be a columnar boss and the fourth mount member may be a projection stopper.

(2) The components may not be mounted in the order described in the above embodiment. For example, after the switch base is mounted on the mount member, the mount member including the switch base may be mounted on the trim portion or door panel.

(3) The configuration of the pull handle may be altered from the above configuration. The pull handle may not include the outer member and the inner member that are separate components. For example, the recessed portion of the pull handle may be configured by mounting only a component having the configuration of the outer member on the armrest. The positions of the inner fitting portion and the outer fitting portion may be switched.

(4) The position and the shape of the opening section are not limited to the ones of the above embodiment. For example, the opening section may be included in a middle of the armrest and may have a circular shape or a rectangular shape.

(5) The vehicular door trim of the above embodiment is a door trim for an automobile but the present technology may be applied to an interior component such as a side trim, a quarter trim, and a pillar garnish. The present technology is not necessarily applied to an automobile (a vehicle) but may be applied to various kinds of vehicles. Examples of the vehicles may be running vehicles on the ground such as a train and an amusement vehicle, flying vehicles such as an airplane and a helicopter, and vehicles on and in the sea such as ship and a submarine.

The invention claimed is:

1. A vehicular door trim comprising:

an armrest including a first mount member;

a pull handle including a body portion, and an extending portion that extends from the body portion and includes a second mount member that is fitted to the first mount member;

an opening section defined by the armrest and the extending portion with the second mount member being fitted to the first mount member; and a switch base including a third mount member that is fitted to the second mount member and disposed in the opening section to cover the opening section with the third mount member being fitted to the second mount member, wherein the armrest and the pull handle are configured as a mount member with the second mount member being fitted to the first mount member, and the first mount member and the second mount member are included in a corner portion of the mount member.

2. The vehicular door trim according to claim 1, wherein the second mount member includes a first fitting portion that is fitted to the first mount member, and a second fitting portion that is disposed on a vehicular exterior side with respect to the first fitting portion and is fitted to the third mount member.

3. The vehicular door trim according to claim 1, further comprising a trim portion on which the pull handle is mounted, wherein the pull handle further includes a fourth mount member with which the pull handle is fixed to the trim portion, and the fourth mount member is on a vehicular exterior side with respect to a portion of the second mount member that is to be fitted to the third mount member.

4. The vehicular door trim according to claim 1, further comprising a trim portion, wherein the second mount member of the pull handle is fitted to the first mount member of the armrest in a first direction, and the mount member is mounted on the trim portion from a second direction that crosses the first direction.

5. The vehicular door trim according to claim 4, wherein the first direction is an upper-bottom direction and the second direction is a vehicular width direction.

6. The vehicular door trim according to claim 1, wherein the second mount member has a fitting hole that opens upward and through which the first mount member is fitted to the second mount member.

7. The vehicular door trim according to claim 6, wherein the second mount member includes a first fitting portion that includes the fitting hole and is fitted to the first mount member, and a second fitting portion that includes a mount hole that opens upward and in which the third mount member is fitted, the first fitting portion includes a separation wall, an inner wall that is opposite the separation wall, and a side wall that connects the separation wall and the inner wall, and the separation wall, the inner wall, and the side wall extend in an upper-bottom direction and define the fitting hole through which the first mount member is fitted and define a space in the fitting hole.

8. The vehicular door trim according to claim 7, wherein the separation wall and the inner wall sandwich the first mount member in a vehicular width direction with the first mount member being contacted with the separation wall and the inner wall when the first mount member is fitted in the space of the first fitting portion.

9. The vehicular door trim according to claim 7, further comprising a trim portion on which the pull handle is mounted, wherein the pull handle further includes a fourth mount member with which the pull handle is fixed to the trim portion, the first fitting portion projects toward a vehicular interior side from the extending portion of the pull handle, and the fourth mount member is on an opposite side with respect to the second fitting portion from the first fitting portion.

10. The vehicular door trim according to claim 7, wherein the first mount member includes a wall portion that projects in a vehicular front-rear direction from a body portion of the armrest, the wall portion has plate surfaces that face a vehicular interior side and a vehicular exterior side and includes a through hole that is through from one of the plate surfaces to another one, and the inner wall of the first fitting portion includes a fitting portion that projects toward the separation wall and is fitted in the through hole of the first mount member with the second mount member being fitted to the first mount member.

11. The vehicular door trim according to claim 10, wherein the first mount member further includes a first wall portion that projects in the vehicular-rear direction from the body portion of the armrest and extends toward the vehicular exterior side from a lower edge of the wall portion, and a second wall portion that extends in the upper-bottom direction and is connected to projecting edges of the wall portion and the first wall portion, the first wall portion includes a first contact projection that projects toward the vehicular exterior side from a vehicular exterior side edge surface of the first wall portion, the second wall portion includes a second contact projection that projects toward the vehicular exterior side from a vehicular exterior side edge surface of the second wall portion, and the first contact projection and the second contact projection are contacted with the separation wall when the first mount member and the second mount member being fitted together.

12. A vehicular door trim comprising:

an armrest including a first mount member;

a pull handle including a body portion, and an extending portion that extends from the body portion and includes a second mount member that is fitted to the first mount member;

an opening section defined by the armrest and the extending portion with the second mount member being fitted to the first mount member; and a switch base including a third mount member that is fitted to the second mount member and disposed in the opening section to cover the opening section with the third mount member being fitted to the second mount member, wherein the second mount member has a fitting hole that opens upward and through which the first mount member is fitted to the second mount member, the second mount member includes a first fitting portion that includes the fitting hole and is fitted to the first mount member, and a second fitting portion that includes a mount hole that opens upward and in which the third mount member is fitted, the first fitting portion includes a separation wall, an inner wall that is opposite the separation wall, and a side wall that connects the separation wall and the inner wall, the separation wall, the inner wall, and the side wall extend in an upper-bottom direction and define the fitting hole through which the first mount member is fitted and define a space in the fitting hole, the first mount member includes a wall portion that projects in a vehicular front-rear direction from a body portion of the armrest, the wall portion has plate surfaces that face a vehicular interior side and a vehicular exterior side and includes a through hole that is through from one of the plate surfaces to another one, and the inner wall of the first fitting portion includes a fitting portion that projects toward the separation wall and is fitted in the through hole of the first mount member with the second mount member being fitted to the first mount member.

13. The vehicular door trim according to claim 12, wherein the first mount member further includes a first wall portion that projects in the vehicular-rear direction from the body portion of the armrest and extends toward the vehicular exterior side from a lower edge of the wall portion, and a second wall portion that extends in the upper-bottom direction and is connected to projecting edges of the wall portion and the first wall portion, the first wall portion includes a first contact projection that projects toward the vehicular exterior side from a vehicular exterior side edge surface of the first wall portion, the second wall portion includes a second contact projection that projects toward the vehicular exterior side from a vehicular exterior side edge surface of the second wall portion, and the first contact projection and the second contact projection are contacted with the separation wall when the first mount member and the second mount member being fitted together.

14. The vehicular door trim according to claim 12, wherein the separation wall and the inner wall sandwich the first mount member in a vehicular width direction with the first mount member being contacted with the separation wall and the inner wall when the first mount member is fitted in the space of the first fitting portion.

15. The vehicular door trim according to claim 12, further comprising a trim portion on which the pull handle is mounted, wherein the pull handle further includes a fourth mount member with which the pull handle is fixed to the trim portion, the first fitting portion projects toward a vehicular interior side from the extending portion of the pull handle, and the fourth mount member is on an opposite side with respect to the second fitting portion from the first fitting portion.

\* \* \* \* \*